United States Patent [19]

Beckmann et al.

[11] Patent Number: 4,458,937

[45] Date of Patent: Jul. 10, 1984

[54] DRAG REDUCER FOR TRACTOR TRAILER

[75] Inventors: Ronald L. Beckmann, Rochester; Willard W. Gregg, Troy; Del C. Schroeder, Bloomfield Hills, all of Mich.

[73] Assignee: General Motors Corporation, Detroit, Mich.

[21] Appl. No.: 439,756

[22] Filed: Nov. 8, 1982

[51] Int. Cl.$^3$ ............................................. B62D 35/00
[52] U.S. Cl. .................................................... 296/1 S
[58] Field of Search .................... 296/1 S, 91; 105/2 R

[56] References Cited

U.S. PATENT DOCUMENTS

| | | | |
|---|---|---|---|
| 3,425,740 | 2/1969 | Vaughn | 296/1 S |
| 3,711,146 | 1/1973 | Madzsar | 296/1 S |
| 3,834,752 | 9/1974 | Cook | 296/1 S |
| 3,945,677 | 3/1976 | Servais | 296/1 S |
| 3,971,586 | 7/1976 | Saunders | 296/1 S |
| 4,035,013 | 7/1977 | Abbott | 296/1 S |
| 4,082,340 | 4/1978 | Taylor | 296/1 S |
| 4,102,548 | 7/1978 | Kangas | 296/1S |
| 4,142,755 | 3/1979 | Keedy | 296/1 S |
| 4,156,543 | 5/1979 | Taylor | 296/1 S |
| 4,257,640 | 3/1981 | Wiley | 296/1 S |
| 4,257,643 | 3/1981 | Choulet | 296/1 S |
| 4,290,639 | 9/1981 | Herpel | 296/1 S |
| 4,311,334 | 1/1982 | Jenkins | 296/1 S |
| 4,343,506 | 8/1982 | Saltzman | 296/1 S |

Primary Examiner—Robert R. Song
Attorney, Agent, or Firm—Charles E. Leahy

[57] ABSTRACT

An aerodynamic drag reducing device for a tractor trailer vehicle includes a rigid deflector panel having its leading edge pivotally mounted on the cab roof and having a length greater than the cab roof so that the trailing edge of the deflector panel overhangs the rear wall of the cab. A pair of rigid cab extender panels are mounted on the rear wall of the cab in alignment with the cab side walls. The deflector panel and extender panels terminate at a distance from the trailer which permits unrestricted turning movement of the tractor relative to the trailer. A pair of air deflecting side members extend generally vertically between each side edge of the rigid deflector panel and the cab roof and the extender panels. The side members are molded urethane and comprise a plurality of foldably interconnected triangular segments which fold relative one another to accommodate pivotal movement of the rigid deflector panel relative to the cab roof and the extender panels. The top edge of the side member is attached to the side edge of the deflector panel. The bottom edge of the side member is attached to the cab roof and to the extender panel. The deflector panel, the extender panels and the side members cooperate to aerodynamically extend the cab toward the trailer to substantially reduce the drag inducing gap therebetween without requiring any connection to or modification of the trailer.

3 Claims, 12 Drawing Figures

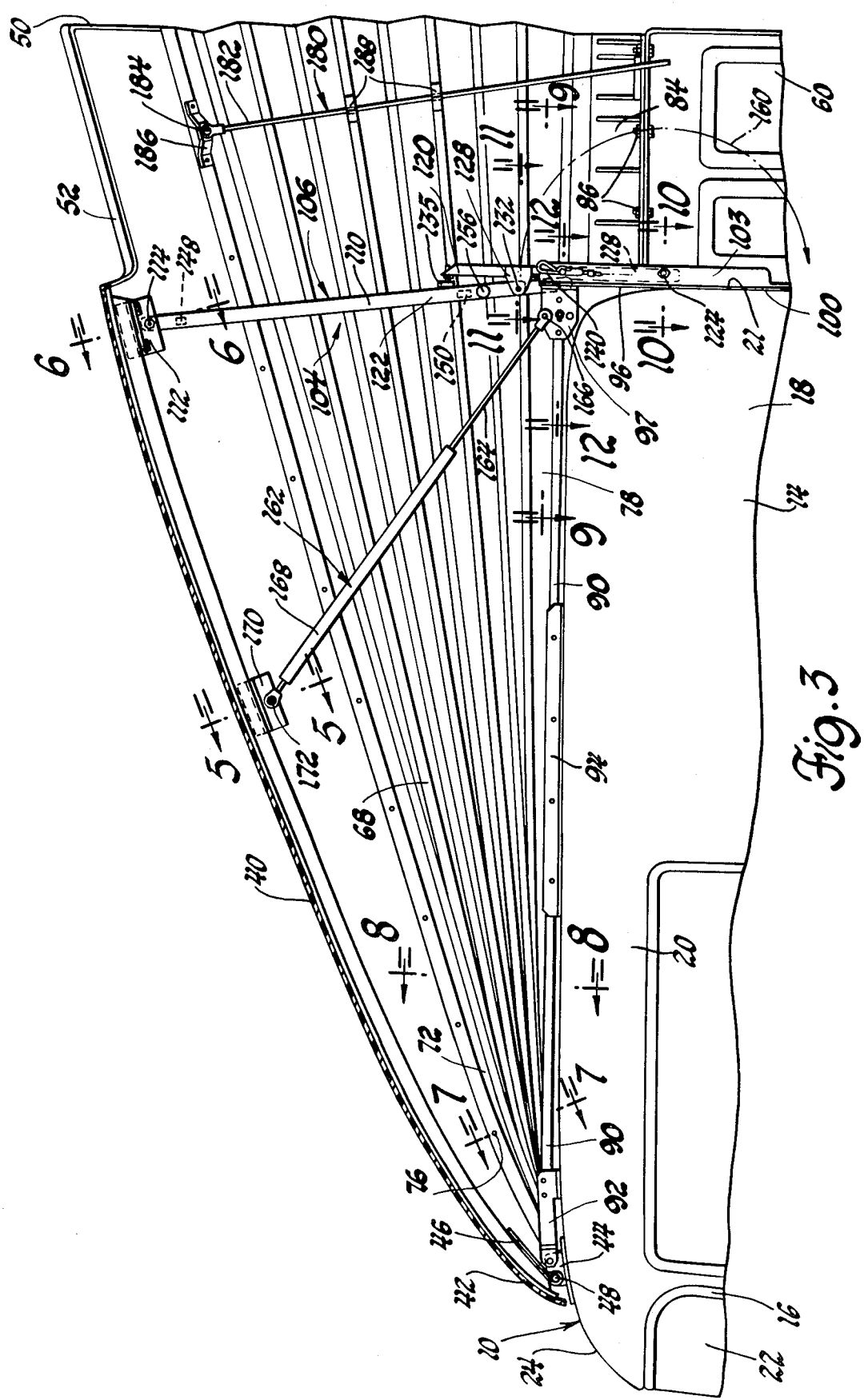

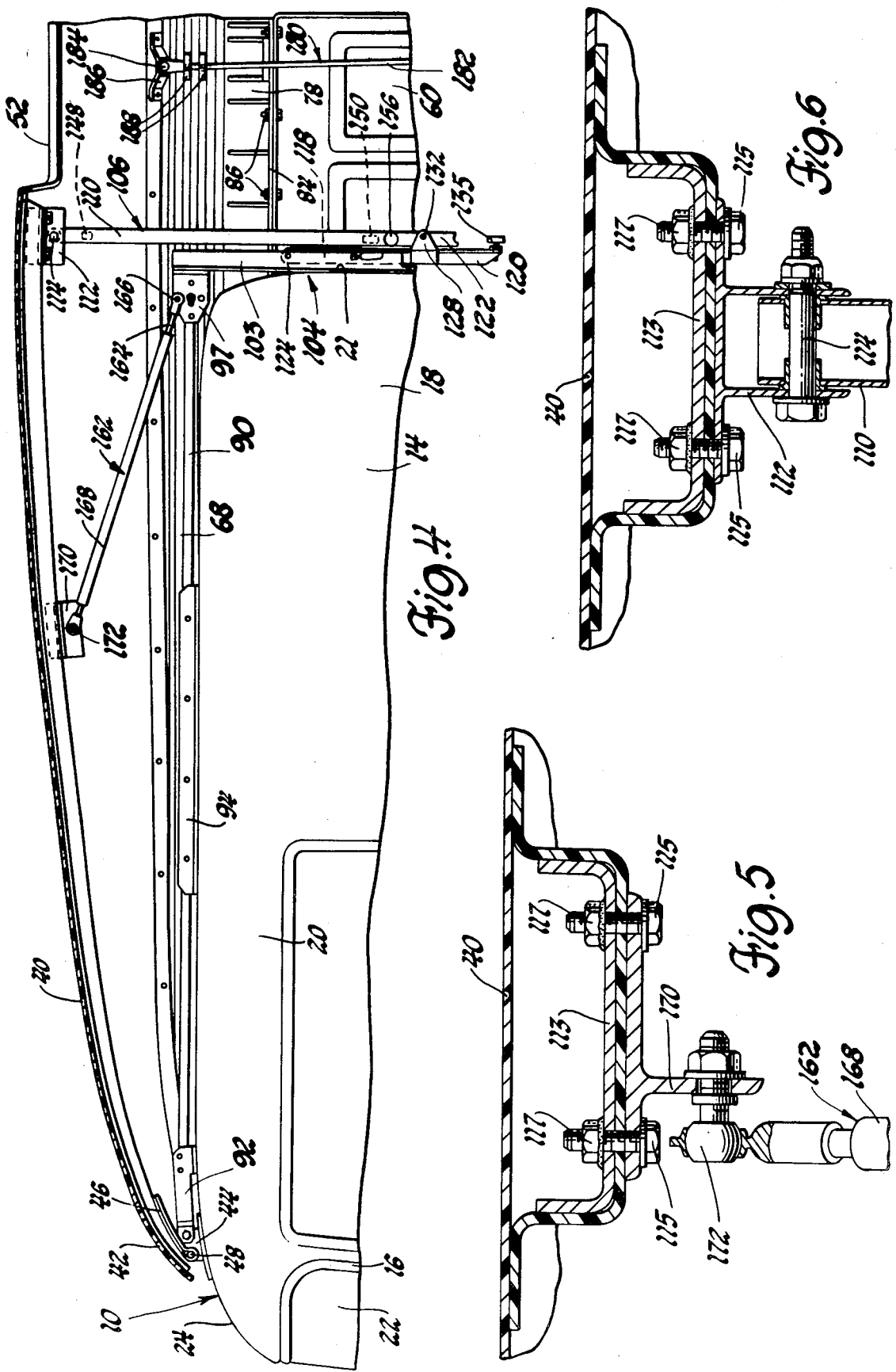

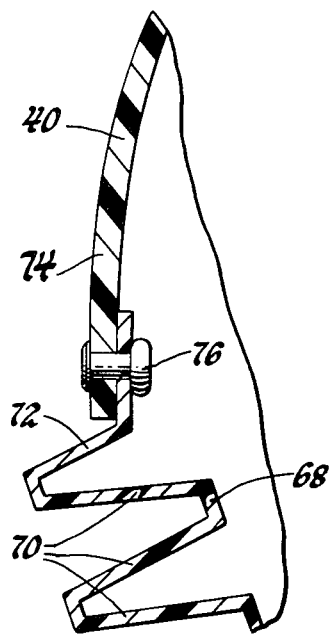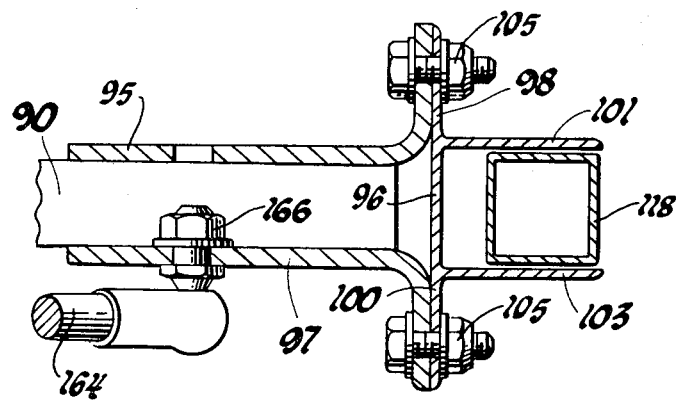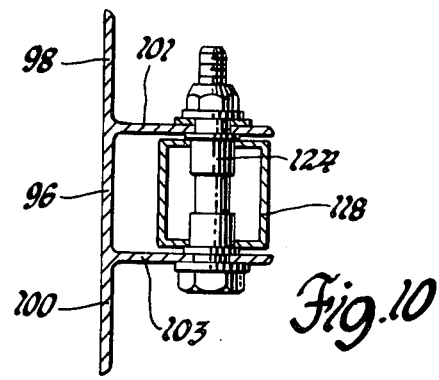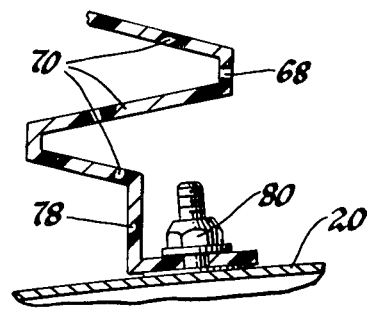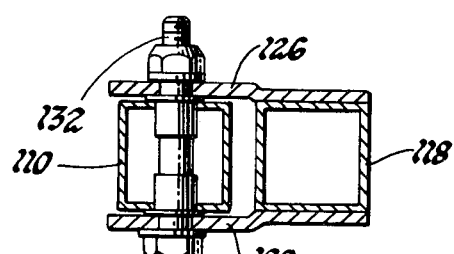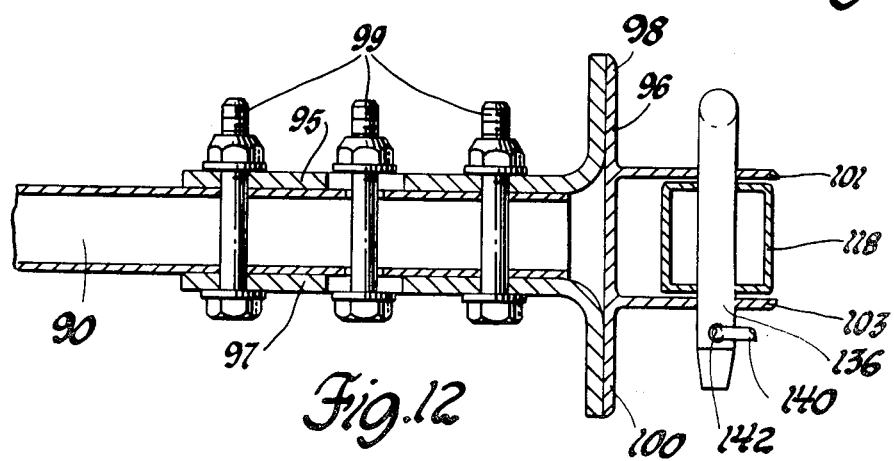

DRAG REDUCER FOR TRACTOR TRAILER

The invention relates to a drag reducing device for improving the aerodynamic characteristics of a tractor trailer vehicle.

BACKGROUND OF THE INVENTION

Conventional tractor trailer vehicles have a trailer body of height greater than the height of the tractor which tows the trailer. Furthermore, the front wall of the trailer body is spaced rearwardly from the rear wall of the tractor cab to permit the tractor to turn relative to the trailer.

Prior U.S. Pat. Nos. such as Madzsar et al 3,711,146; Cook et al 3,834,752; Servais et al 3,945,677; and Keedy 4,142,755 disclose various devices for streamlining tractor trailer vehicles by filling in the gap between the tractor and the trailer through the use of inflated flexible bags or a plurality of hinged or telescoping metal panels. Other prior U.S. Pat. Nos. such as Taylor et al 4,156,543 and Wiley 4,257,640 disclose the use of a tractor roof mounted deflector used in conjunction with a retractible or articulated baffle which extends between the cab and the front wall of the trailer.

Although aerodynamically efficient, such drag reducers have not been commercially successful because of the cost, complexity, and problems of maintenance and serviceability. In some systems, both the tractor and trailer must carry cooperating elements of the system so that both the tractor and the trailer must be dedicated for use with correspondingly equipped tractors and trailers. Furthermore, such systems complicate the task of hooking and unhooking the tractor from the trailer.

It would be desirable to provide a commercially practical aerodynamic drag reducer which aerodynamically approximates the effect of completely filling the gap between the tractor and trailer and yet has no connection to the trailer to thereby facilitate interchangeability between tractors and trailers.

SUMMARY OF THE INVENTION

According to the invention an aerodynamic drag reducing device for a tractor trailer vehicle includes a rigid deflector panel having its leading edge pivotally mounted on the cab roof and having a length greater than the cab roof so that the trailing edge of the deflector panel overhangs the cab. A pair of rigid cab extender panels are mounted on the rear wall of the cab in alignment with the cab side walls. The deflector panel and extender panels terminate at a distance from the trailer which permits unrestricted turning movement of the tractor relative to the trailer. A pair of foldable air deflecting side members extend generally vertically between each side edge of the rigid deflector panel and the cab roof and the extender panels. The side members are molded urethane and comprise a plurality of foldably interconnected triangular segments which fold relative one another to accommodate pivotal movement of the rigid deflector panel relative to the cab roof and the extender panels. The top edge of the side member is attached to the side edge of the deflector panel. The bottom edge of the side member is attached to the cab roof and to the extender panel. The deflector panel, the extender panels and the side members cooperate to aerodynamically extend the cab toward the trailer to substantially reduce the drag inducing gap therebetween without requiring any connection to or modification of the trailer.

Accordingly, the object, feature and advantage of the invention resides in the rearward extension of the aerodynamic profile of a tractor for towing a trailer through the provision of a rigid pivotal deflector panel substantially overhanging the cab and extending toward the trailer, rigid side wall extender panels attached to the cab and extending toward the trailer, and foldable side members having top edges attached to the deflector panel and bottom edges attached to and supported by the cab roof and the side wall extender panels.

DESCRIPTION OF THE DRAWINGS

These and other objects, features and advantages of the invention will become apparent upon consideration of the specification and the appended drawings in which:

FIG. 3 is a side elevational sectional view taken in the direction of arrows 3—3 of FIG. 1 and showing the drag reducer raised to the normal air deflecting position;

FIG. 4 is a view similar to FIG. 3 but showing the drag reducer collapsed to the stored position; and FIGS. 5 through 12 are sectional views taken in the direction of the correspondingly designated arrows of FIG. 3.

DESCRIPTION OF THE PREFERRED EMBODIMENT

Figure 1:
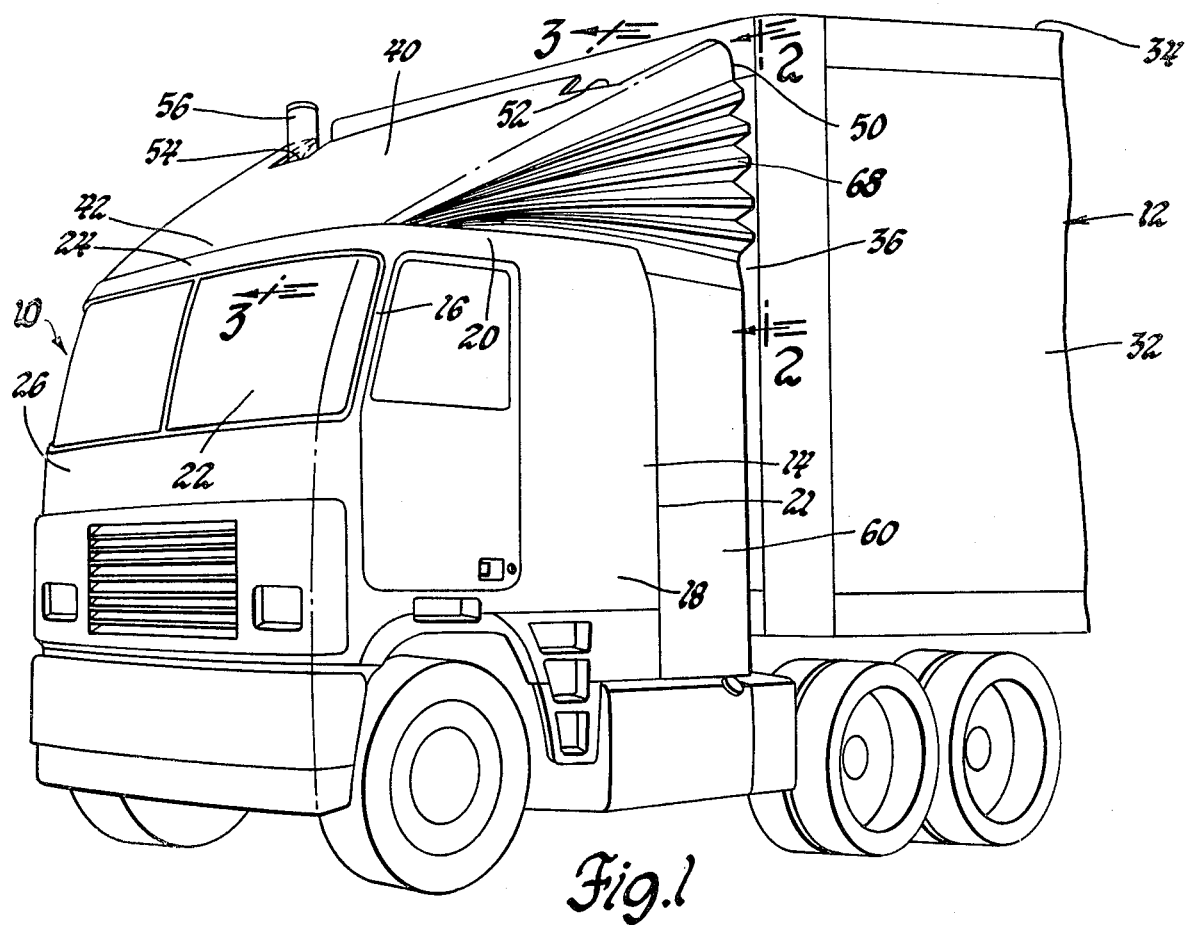
FIG. 1 is a perspective view of a tractor-trailer vehicle having a drag reducer according to the invention.

Referring to FIG. 1, the conventional tractor trailer vehicle includes a tractor 10 and a trailer 12. The tractor 10 has a sleeper cab-over-engine configuration, but alternatively could be a nonsleeper cab-over-engine or a conventional configuration. The cab 14 of the tractor 10 includes windshield pillars 16, cab sidewalls 18, and a cab rear wall 21 which support the cab roof 20. Windshield 22 is flush with windshield pillar 16, a windshield header 24, and a front panel 26 of the cab 14 so that the cab 14 presents a buffer frontal contour to the approaching airstream.

The conventional trailer 12 has a rectangular shape and includes sides 32, a roof 34 and a front wall 36. The cab 14 of the tractor 10 and the front wall 36 of the trailer wall are spaced longitudinally of one another so that the tractor 10 can turn relative to the trailer 12. The roof 20 of the tractor 10 is at a lower elevation than roof 34 of the tractor 12.

As seen in FIGS. 1 and 3, a rigid deflector panel 40, preferably of resin transfer molded fiberglass, has a leading edge 42 which is disposed closely adjacent the windshield header 24. The leading edge 42 of the rigid deflector panel 40 is pivotally mounted on the cab roof 20 generally adjacent the windshield header 24 by a pivot bracket 44 attached to the cab roof 20 and a hinge link 46 which is suitably bolted to the rigid deflector panel 40 and connected to the anchor bracket 44 by a pivot bolt 48. A pair of these hinges is employed with one such hinge at each of the front corners of the deflector panel 40. The trailing edge 50 of the deflector panel 40 is recessed at 52 and 54 to accommodate the exhaust stack or engine air intake stack 56. The deflector panel 40 overhangs the rear wall 21 and terminates short of the trailer front wall 36 so that the tractor can articulate relative to the trailer 12.

Figure 2:
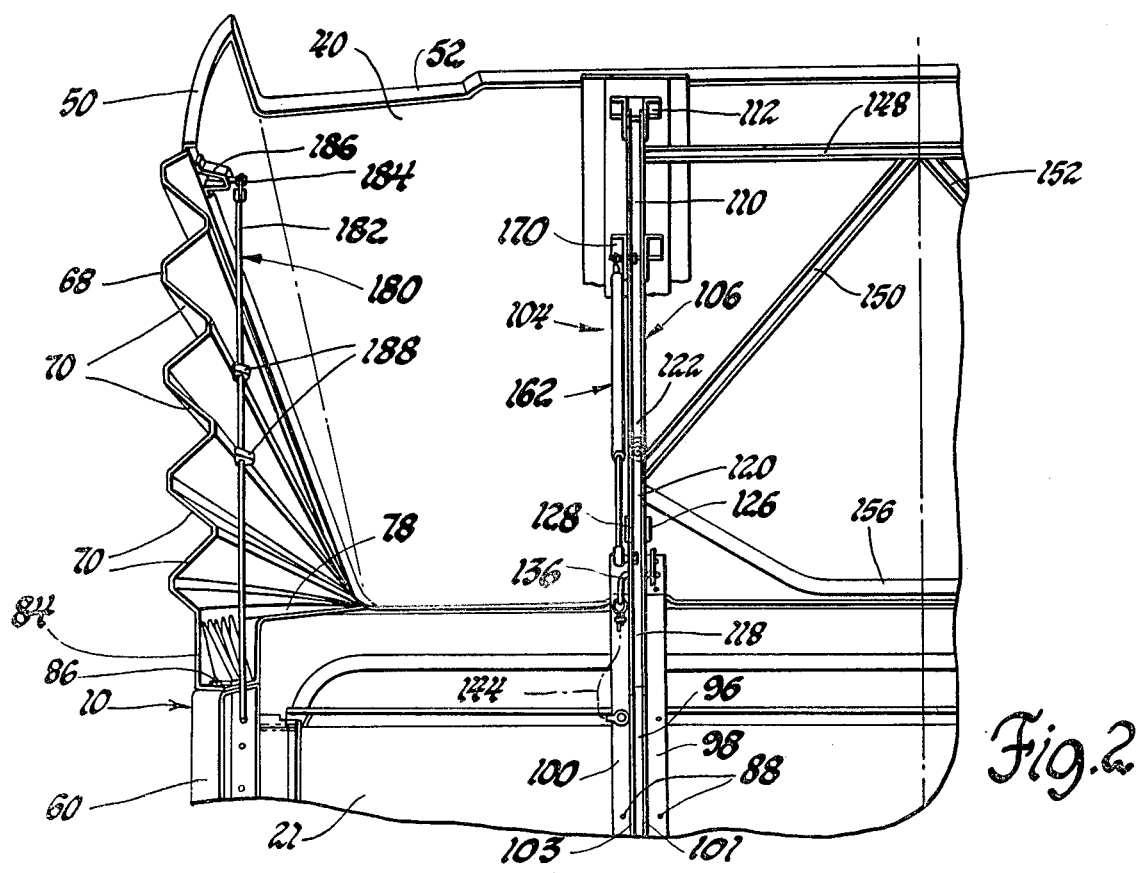
FIG. 2 is a view taken in the direction of arrows 2—3 of FIG. 1 and showing a rear elevation view of the drag reducer together with the collapsible support and guide rod therefor.

Referring to FIGS. 1, 2 and 3, it is seen that an extender panel 60 is attached to the rear wall 21 of the cab and aligns generally with the cab side wall 18 to aerodynamically extend the cab side wall 18 rearwardly toward the front wall 36 of the trailer. The extender panel terminates short of the trailer front wall 36 so that the tractor 14 can articulate relative to the trailer 12. A like extender panel 60 is provided at the other side of the cab 14. The extender panels are preferably constructed of molded fiberglass and have integrally formed stiffening ribs and the like which provide a wind and vibration resistant structural stiffness and facilitate attachment of the extender panels 60 to the cab rear wall 18 by appropriate bracketry, not shown.

Referring again to FIGS. 1 and 2, it is seen that the leading edge 42 of the deflector panel 40 is narrower than the trailing edge 50 thereof so that the deflector panel 40 has the plan form configuration of a truncated isosceles triangle. Furthermore, it is seen that the nonparallel side edges of a deflector panel 40 are connected to the cab roof 20 and the extender panels 60 by bellows-type air deflecting side members 68. The side members 68 are molded of a semi-rigid urethane and include a plurality of foldably interconnected segments 70 of a triangular shape which fold and unfold relative one another to accommodate variation in the angle of the deflector panel 40 relative to the cab roof 20.

As best seen in FIG. 7, the nonparallel side edge 74 of the rigid deflector 40 are curved downwardly and attached to the topmost segment 72 of the side members 58 by a plurality of rivets 76. FIG. 8 shows that the bottommost segment 78 of the side member is attached to cab roof 20 by nut and bolt assemblies 80. FIGS. 2 and 4 show that the rearwardmost portion of the side member 68 includes a flap 84 which depends from the bottommost segment 78 and is attached to the top of the extender panels 60 by a plurality of fasteners 86.

The angular position of the deflector panel 40 is varied between a raised wind deflecting position of FIGS. 1 and 3 and a lowered position of FIG. 4 by a support mechanism indicated generally at 104. The support mechanism 104 includes a pair of collapsible linkages, one of which is shown at 106, which are laterally spaced apart and act between the deflector panel 40 and a vertical support 96 having legs 98 and 100 attached to the rear wall 21 of the cab 14 by bolts 88. The vertical support 96 is braced by a longitudinal extending rail 90 having its forward end attached to the roof by a bracket 92, its intermediate portion attached to the cab roof by a bracket 94 and its rearward end attached to the vertical support 96 by brackets 95 and 97 and nut and bolt assemblies 99 and 105 as seen in FIGS. 9 and 12.

As seen best in FIGS. 2 and 3, the collapsible linkage 106 includes a support link 110 of square tubing having its upper end pivotally connected to the deflector panel 40 via a bracket 112 and a pivot bolt 114 as shown in FIG. 6. The bracket 112 is attached to a reinforcement 113 molded into the deflector panel 40 by screws 115 and weld nuts 117. The collapsible linkage 106 also has a pivot link 118 of square tubing including an upper end portion 120 which has a generally coextensive parallel relationship with a lower end portion 122 of the support link 110. The lower end of the pivot link 118 is pivotally connected to channel walls 101 and 103 of the vertical support 96 by a pivot bolt 124 as seen in FIG. 10. The lower end of the support link 110 is pivotally connected to a central portion of the pivot link 118 by brackets 126 and 128 which are welded or otherwise suitably attached to the pivot link 118 and surround the support link 110 as shown in FIG. 11. A pivot bolt 132 extends through the brackets 126 and 128 and through the support link 110.

As best seen in FIG. 3, the collapsible linkage 106 supports the deflector panel 40 at the raised wind deflecting position when the pivot link 118 and the support link 110 are established in the extended and generally coextensive parallel relationships shown in FIG. 3. This coextensive relationship is established by a screw mounted adjustable bumper pad 135 which is mounted at the upper end of the pivot link 118 and bears against the support link 110. This generally coextensive and extended position of the pivot link 118 and support link 110 is maintained by a latch pin 136, best seen in FIG. 12, which extends through aligned apertures in the channel walls 101 and 103 of the vertical support bracket 96 and aligned apertures in the pivot link 118. A retainer pin 140 extends through a hole 142 in latch pin 136 and is selectively removable therefrom to permit removal of the latch pin 136. The latch pin 136 is preferably connected to the vertical support 96 by a tether cable 144 so that the latch pin 136 is not inadvertently mislaid.

Referring to FIG. 2, it is to be understood that a second collapsible linkage like the collapsible linkage 106 shown therein is provided at the other side of the deflector panel 40 and is not shown in the drawing. The collapsible linkages 106 are connected by braces 148, 150 and 152 as well as a handlebar 156 which extend between the support links 110 of the collapsible linkages 106. The handlebar 156 is bowed downwardly as seen in FIG. 2 so that it is accessible to a vehicle operator standing on the tracter frame rails behind the cab 14.

As best seen by comparing FIGS. 3 and 4, the deflector panel 40 is lowered from the raised position of FIG. 3 to the stowed position of FIG. 4 by collapsing the collapsible linkage 106. This collapse is achieved by the vehicle operator withdrawing the retaining pin 140 from the latch pin 136 and then removing the latch pin 136 from the vertical support 96 and the pivot link 118. The handlebar 156 is then gripped and pulled rearwardly and downwardly so that the pivot link 118 is caused to pivot about the pivot bolt 124 at the lower end thereof. This pivoting movement of the pivot link 118 causes the pivot bolt 132 connecting the pivot link 118 with the support link 110 to move in the arcuate path shown by the arrow 160 of FIG. 3. Accordingly, the lower end of the support link 110 is pivoted rearwardly and withdraws the support link 110 downwardly from support of the deflector panel 110. The pivoting movement of the pivot link 118 continues through approximately 180° degrees of rotation until the pivot link 118 obtains the vertical position of FIG. 4 in generally parallel relationship with the support rod 110. The latch pin 136 is then reinstalled between the pivot link 118 and the vertical support 96 to retain the collapsible linkage 106 in the collapsed portion and thereby retain the deflector panel 40 at its stowed position of FIG. 4.

Return of deflector panel 40 to the raised position of FIG. 3 is performed by lifting the handlebar 156 upwardly and outwardly to effect pivoting movement of the pivot link 118 and return the support link 110 to its position of FIG. 3. This lifting of the deflector panel 40 is assisted by a gas spring assembly 162 or the like which has a rod 164 connected to the bracket 97 by a pivot 166 shown in FIG. 9. The rod 164 telescopes within a cylinder 168 connected to a bracket 170 of deflector panel 40 by a pivot 172 shown in FIG. 5. In general, the gas spring assembly 162 has a compressed gas housed therewith and acting to extend the length of the gas spring 162 so that the deflector panel 10 is urged to the raised position.

Referring to FIGS. 2 and 3 there is shown a guide rod assembly 180 which functions to support and guide the side member 68. The guide rod assembly 180 includes a rod 182 which is pivotally connected to the deflector panel 40 by a pivot pin 184 and bracket 186. A plurality of eyelets 188 are connected to the side member 68 at the juncture between the triangle-shaped segments 70 and slidably receive the guide rod 182. Accordingly, the guide rod 182 stiffens the side member 68 so that crosswind buffeting the side member 68 will not cause excessive bowing, flutter, or flapping of the side member 68. The guide rod 182 slides through the eyelets 188 upon movement of the deflector panel 40 between the raised and stowed positions and assures that the segments 70 fold neatly one upon the other when the deflector panel 40 obtains the stowed position of FIG. 4.

Thus it is seen that the invention provides a new, novel, and commercially practical aerodynamic drive reducer which aerodynamically approximates the effect of completely filling the gap between the tractor and the trailer and yet has no connection to the trailer to thereby facilitate the interchangeability between tractors and trailers. More particularly, the aerodynamic profile of a tractor for towing a trailer is extended rearwardly through the provision of a rigid pivotally mounted deflector panel substantially overhanging the cab and extending toward the trailer, a pair of rigid sidewall extender panels attached to the cab and extending toward the trailer, and a pair of foldable side members having top edges attached to the deflector panel and bottom edges attached to and supported by the cab roof and the side wall extender panels.

The embodiments of the invention in which an exclusive property or privilege is claimed are defined as follows:

1. A tractor mounted aerodynamic drag reducing device for a tractor trailer vehicle including a tractor defined in part by a cab roof with a leading edge and a trailing edge and cab side walls, said aerodynamic drag reducing device comprising:

a rigid deflector panel of greater length than the cab roof and having a leading edge, a trailing edge and side edges;

pivot means mounting the leading edge of the deflector panel on the cab roof adjacent the leading edge of the cab roof;

a pair of extender panels mounted respectively on the cab and adapted to effectively aerodynamically extend the cab side walls rearwardly toward the trailer and having trailing edges adapted to align generally with the trailing edge of the rigid deflector panel; and a pair of air deflecting side members respectively extending generally vertical between each side edge of the rigid deflector panel and the cab roof and extender panels, said side members each having a plurality of elements foldably interconnected for folding relative one another to accommodate pivotal movement of the rigid deflector panel relative the cab roof and the extender panels and having a top edge attached to the side edge of the deflector panel and a bottom edge attached to the cab roof and the extender panel whereby the cab wall extender panel, the deflector panel, and air deflecting side members cooperate to aerodynamically extend the cab toward the trailer.

2. A tractor mounted aerodynamical drag reducing device for a tractor trailer vehicle including a tractor defined in part by cab side walls and by a cab roof, said aerodynamic drag reducing device comprising:

a pair of rigid extender panels mounted on the cab and extending rearwardly therefrom in general alignment with the cab side walls and terminating a distance from the trailer to permit turning movement of the tractor relative to the trailer;

a rigid roof mounted deflector panel extending rearward beyond the cab roof and terminating a distance from the trailer to enable turning movement of the tractor relative to the trailer and having a leading edge pivotally mounted on the cab roof to enable pivotal movement of the deflector panel, a pair of air deflecting side members depending generally vertically from the rigid deflector panel to the cab roof and the extender panels, said side members being adjustable to accommodate pivotal movement of the rigid deflector panel relative to the cab roof and the extender panels and having a top edge attached to the deflector panel and a bottom edge attached to the cab roof and the extender panel whereby the extender panels, the deflector panel, and air deflecting side members cooperate to aerodynamically extend the cab toward the trailer;

and support means acting between the cab and the deflector panel to effect pivotal movement of the deflector panel.

3. A tractor mounted aerodynamic drag reducing device for an articulating tractor trailer vehicle including a tractor defined in part by a cab roof with a leading edge and a trailing edge and cab side walls, said aerodynamic drag reducing device comprising:

a rigid deflector panel of greater length than the cab roof and having a leading edge, a trailing edge and side edges;

pivot means mounting the leading edge of the deflector panel on the cab roof adjacent the leading edge of the cab roof so that the trailing edge of the deflector panel extends rearwardly beyond the trailing edge of the cab roof and into noninterfering articulation permitting proximity with the trailer;

a pair of air deflecting side members respectively depending from the side edges of the rigid deflector panel and extending rearwardly beyond the trailing edge of the cab roof and into noninterfering articulation permitting proximity with the trailer, said side members each having a plurality of generally planar elements foldably interconnected for folding relative one another to accommodate pivotal movement of the rigid deflector panel relative the cab roof and having a forward bottom edge portion attached to the cab roof and a rearward bottom edge portion extending rearwardly beyond the cab roof;

a pair of extender panels mounted on the cab and extending rearwardly therefrom in a general alignment with the cab side walls and into noninterfering articulation permitting proximity with the trailer;

and means attaching the rearward bottom edge portion of the side members upon the extender panels whereby the cab wall extender panels, the deflector panel, and air deflecting side members cooperate to aerodynamically extend the cab into noninterfering articulation permitting proximity with the trailer.

* * * * *